Sept. 22, 1970  E. H. SHEFTELMAN ET AL  3,530,470
RADIO RANGING SYSTEM
Filed Jan. 25, 1968  4 Sheets-Sheet 1

INVENTORS
EUGENE H. SHEFTELMAN
ANDREW S. GRIFFITHS
ARNOLD M. McCALMONT
WILLIAM H. SMITH
BY
Blair, Buckles, Cesari & St. Onge
ATTORNEYS INVENTORS
EUGENE H. SHEFTELMAN
ANDREW S. GRIFFITHS
ARNOLD M. McCALMONT
WILLIAM H. SMITH
BY
Blair, Buckles, Cesari & St. Onge
ATTORNEYS Sept. 22, 1970  E. H. SHEFTELMAN ET AL  3,530,470
RADIO RANGING SYSTEM Filed Jan. 25, 1968

INVENTORS
EUGENE H. SHEFTELMAN
ANDREW S. GRIFFITHS
ARNOLD M. McCALMONT
WILLAM H. SMITH
BY
Blair, Buckles, Cesari & St. Onge
ATTORNEYS 3,530,470
RADIO RANGING SYSTEM
Eugene H. Sheftelman, Weston, Andrew S. Griffiths, Auburndale, Arnold M. McCalmont, South Acton, and William H. Smith, Hanover, Mass., assignors to Technical Communications Corporation, Lexington, Mass.
Filed Jan. 25, 1968, Ser. No. 700,599
Int. Cl. G01s 9/56, 9/06
U.S. Cl. 343—6.5                                15 Claims

ABSTRACT OF THE DISCLOSURE

A radio ranging system operates in the medium to high frequency band and employs wide band modulation techniques to minimize interference problems. An initiating station transmits a pseudo-random code word and a transponding station retransmits the same or another code word to the initiating station or to one or more other stations. The distance between the initiating and transponding stations is then determined by measuring the elapsed time between the initial transmission of the code word and receipt of the responding signal. The system may be arranged in a variety of configurations to assist a navigator in accurately determining his position.

BACKGROUND OF THE INVENTION

Field of the invention

This invention relates to a radio ranging system. The primary use of the invention is in a navigation system in which the position of a movable station on a ship or other vehicle is determined by ascertaining its distance from a set of base stations having known positions. In simpler form the invention may be used merely to determine the distance between a transmitting point and another location by echo ranging, either through the use of a reflection or a return signal from a transponder.

Prior art

Radio navigation systems generally take one of two forms. One of these is an arrangement in which the times of arrival of signals from a pair of fixed transmitting stations are compared, with the difference between the arrival times locating the navigator along one of two hyperbolas corresponding to this difference. A similar determination involving another pair of transmitting stations, one of which may be one of the first pair, provides a second hyperbola one of whose intersections with the first fixes the location of the navigator.

The second system involves a species of echo ranging in which the navigator transmits a signal that is received and then retransmitted by a fixed station. (The return transmission may involve a change in frequency and/or modulation.) The time interval between the initial transmission and the receipt of the return signal from the fixed station is a measure of the distance therefrom, and this positions the navigator on a circle centered on the fixed station. Transmission to a second fixed station positions the navigator on a circle centered on the latter station, and an intersection of the two circles fixes his position.

Prior to the present invention, the echo ranging system has been pretty much limited to ultra-high and microwave frequencies because of the large bandwidth required. Electromagnetic energy propagates through the atmosphere at the rate of approximately 1000 feet per microsecond, and therefore a ranging accuracy of even 50 feet requires an accuracy of 0.1 microsecond in measurement of the round-trip time of the signal transmitted by the navigator. This, in turn, usualy requires a large bandwidth if the relative timing of the transmitted and return signals is to be established within the required accuracy. Even this margin of error is intolerable for some applications, such as the location of an underwater drilling site. In any case, systems operating at the high frequencies heretofore required for the large bandwidths utilized in accurate echo ranging are limited to line-of-sight applications, and therefore are quite limited in range, particularly if the navigating station antenna is at low altitude, e.g. on a ship at sea.

Most of the existing systems used for medium range surface navigation operate at a frequency of about 2 mHz. or lower. Some of these make use of the relative timing of pulses from fixed stations. Because of bandwidth limitations, they cannot, with presently used timing techniques, fix positions to a sufficiently high degree of accuracy for some purposes, particularly at ranges of several hundred miles from the fixed stations. In other systems operated at low frequencies, the fixed stations transmit continuous signals with a known phase relationship among them. The navigating station then compares the relative phases of the signals from the fixed stations to determine the difference in propagation times from them. Accuracy is limited by the difficulty in obtaining phase measurements corresponding to small differences in position. Moreover, there is an ambiguity resulting from the fact that a given phase difference corresponds to a succession of "lanes" spaced apart by a distance corresponding to the wavelength. The navigator must therefore count the lanes from some known reference point to know which one he is in. There is often a loss of count, necessitating ancillary means of lane identification.

Major limitations of existing low frequency systems result from atmospheric disturbances and other types of radio interference. Moreover, their accuracy, which is insufficient for many purposes even in the daytime, decreases substantially at nighttime because of "self-interference" by the sky-wave component of the transmitted signal. Because the transmission time of the sky wave varies continually, the received signal, which is the resultant of the sky-wave and ground-wave components undergoes both amplitude and phase variations which greatly lessen the reliability of the system. An even more severe problem involves interference from sky-wave propagated signals from other sources.

A principal object of the present invention is to provide a radio navigation system providing high accuracy at distances up to several hundred miles from a reference station, regardless of the time of day.

A further object of the invention is to provide a system characterized by minimal interference to other users of the radio frequency spectrum and relative immunity from interference generated by them.

A further object of the invention is to provide a navigation system of the above type making use of a circular solution for determination of position. A related object of the invention is the provision of a radio ranging system having the characteristics set forth above. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be made to the following detailed description taken in connection with the accompanying drawings, in which.

Figure 1:
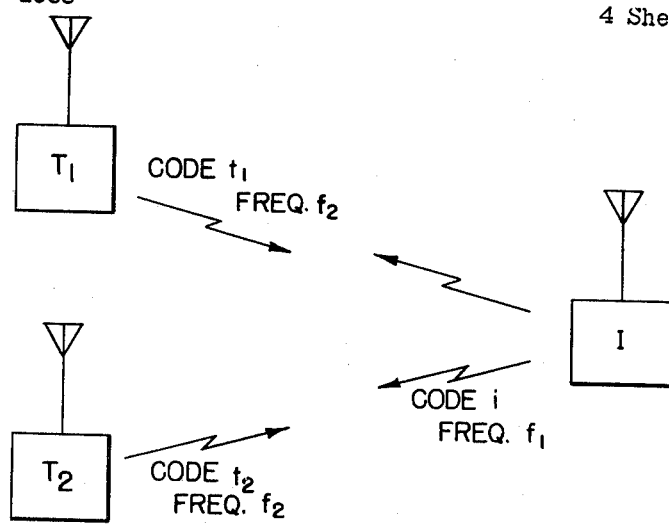
FIG. 1 is a block diagram of a navigation system embodying the invention.

In brief, our invention operates in the medium to high frequency range, that is, from about 0.3 mHz. to 30 mHz. It can take the form of either an echo ranging or hyperbolic system, although the former is generally to be preformed because of the inherently greater accuracy obtainable in many cases from the use of intersecting circles, as opposed to intersecting hyperbolas.

The medium to high frequency range has heretofore been rejected for navigational purposes, largely because its propagation characteristics are inferior for such usage. The ground wave, which is normally the desired signal, undergoes rather severe attenuation; at the same time, the sky wave, which is normally considered only interference, provides a much greater signal strength than at other frequencies. Thus, the resultant signal at any point removed from the transmitter by more than fifty miles or so has an unduly variable propagation time and is subject to strong interference from other signals. Moreover, deep fading caused by interference from their sky-wave components often completely obliterates conventional high frequency signals at the ranges required for navigation systems. Also, the medium-to-high frequency band is crowded and thus bandwidth limitations imposed in this band would lead one to believe that the inherent accuracy of a navigational system operating at such frequencies would be no greater than the accuracy obtainable with the lower frequency systems.

Our inventions overcomes these limitations by employing a technique heretofore used only at much higher frequencies. This technique involves the modulation of a transmitted signal in accordance with a relatively long string or "word" of binary digits (bits). This word, which is continuously repeated, is received by a transponding station and, in the simplest form of the invention, it is retransmitted to the initiating station. The round-trip time for the signal is measured to determine the distance between the two stations.

Preferably, though not necessarily, phase modulation is used and the system specifically described herein employs this technique. To provide an accurate time measurement, the phase changes in the transmitted signal corresponding to successive digits in the code word must be well defined. This means that the system must have a large bandwidth, and the energy should be well spread over the required band. An envelope of this nature corresponds to a relatively high bit rate in the code word transmission. As will be seen from the detailed description to follow, a high bit rate is compatible with the desire for rapid and accurate range measurement. But, it would appear at first glance that the large bandwidth required, e.g. 1 mHz., would cause intolerable interference with other users of this portion of the radio frequency spectrum. At the same time, it would appear that the signals transmitted by the many other stations within the band would prevent the reception of useful signals by the ranging system.

The use of "spread-spectrum coding," however, eliminates both interference problems. Spreading the radiated power evenly over a wide bandwidth ensures that the amount of interference entering any conventional (narrow-band) receiver will be less than the ambient noise, provided the navigation system's spectral lines are closely spaced and no not include salients of excessive amplitude. This is true if the modulation is in the form of pseudo-random or noise-like codes of adequate length: the spectrum width of such signals is determined by the frequency of modulation or bit rate and the line separation by the repetition rate of the pseudo-random sequence or code "word." This code pattern also ensures relative immunity to interference from other sources because of the correlation process in the ranging receivers. Incoming signals are continuously modulated with a locally-generated code identical to that expected. This has the effect of spreading narrow-band interference over a spectrum equal to the bandwidth, whereas the desired wideband signal is reduced by the same process to a coherent sine wave once synchronization is achieved.

As an example, the word length may be 10,000 bits and the bit rate may be 1 mHz, producing a line spectrum of effectively 1 mHz. width and a line separation of 100 Hz. The total radiated power from either station may be substantially less than 100 watts, and the system can operate without any frequency allocation in the conventional sense.

More specifically, if a 180° phase shift, i.e. ±90°, is used to denote a shift from a binary zero to a one, or vice versa, there will be no significant spectral line at the center frequency. Furthermore, with the "spread-spectrum coding" described above there will be no dominant line at any frequency. The phase reference ordinarily provided by the carrier is reconstituted at the receiver in an arrangement described in detail below.

Range measurement depends entirely on the "ground wave" propagation mode, the speed of which is sufficiently predictable over short time periods and over the system bandwidth to support reliable range-measurement accuracy. Two kinds of "sky-wave" interference problems must be treated, both of which are particularly disruptive of conventional systems in nighttime operation: (a) ionospheric refraction of the desired signal, producing fading and spurious outputs; and (b) long-range ionospheric refraction of distant transmissions, adding large amounts of uncorrelated interference to the band.

Sky-wave problems of the first kind are largely eliminated by discriminating against the sky-wave signal at the receiver. This is accomplished through inherent wideband characteristics of the system as already described. In the first place, the propagation characteristics of the sky wave vary substantially over the relatively large bandwidth of the system and thus the various spectral lines in the signal are decorrelated to a great extent by the ionospheric refraction process. The correlation receiver is therefore less sensitive to the sky-wave signal than to the ground-wave signal.

In the second place, since the sky wave propagation time is always longer than the ground-wave propagation time, the receiver can be made to lock onto the ground wave signal by searching for the signal having the earlier arrival time, i.e. the ground wave. It will then disregard the sky wave if the two components are separated in time by at least the duration of one bit of the code word as they arrive. Interference due to a delayed replica of the expected signal is suppressed in pseudo-noise correlation receivers by a factor equal to the square of the code length (80 db in the case of a 10,000-bit code word).

At the initiating station, the signals returning from their round trip to and from the transponding station are compared with replicas of the transmitted signals, and the amount by which the incoming signals lag the transmitted ones is measured to obtain range. The lag measurement can be divided into three portions. The first is a coarse portion corresponding to the integral number of bits separating the code words being compared. The second is a medium portion corresponding to the integral number of radio frequency cycles within the remaining portion of a bit. The third is a phase comparison determining the remaining fraction of a cycle. The sum of the three measurements is the output of the system.

The echo ranging system described above can be used by a single ship in conjunction with two shore stations to provide the two ranges required for a circular solution of the ship's position. Alternatively, three or more shore stations may be used to derive differences in range to the ship for the hyperbolic solution. In this latter arrangement, the shore stations may, in one example, transmit the same code word at different frequencies, with the beginning of the code words being synchronized. The ship may then ascertain the difference in arrival times in the code words in the same manner as the difference in time between a received and internally-generated code word is determined in the echo ranging system. This hyperbolic solution has the advantage of requiring only reception by the ship, i.e. no transmission therefrom is needed. Disadvantages of the hyperbolic solution are the extra shore station required, the reduced accuracy associated with resolving hyperbolic rather than circular intersections, and the precise synchronization link required between each pair of shore stations.

The common characteristic of all usages of the invention is the comparison of identical signals, one of which is delayed with respect to the other. Since radio waves propagate at closely-known speeds, the delay is an accurate measure of distance or relative distance.

In a system capable of accommodating a multiplicity of users, the respective users may take turns in determining their positions according to some prearranged order. It is preferable, however, for all users to have simultaneous access to the system and in such case they must either transmit on different frequencies or use different code words in their transmissions to the fixed stations. The system about to be described uses the latter arrangement.

FIG. 1 illustrates an elementary navigation system embodying the invention. An initiating station I is arranged to determine its position with a pair of transponding stations $T_1$ and $T_2$. The station I transmits its code $i$ to both the transponding stations on a carrier frequency $f_1$. The responding signals from the stations $T_1$ and $T_2$ must be distinguishable from each other, and in the illustrated arrangement this is accomplished by the use of different responding codes $t_1$ and $t_2$, respectively, transmitted on a carrier frequency $f_2$. As described above, the initiating station I then separately determines the round-trip time for signals to and from the transponding stations and thereby determines its range from the latter. Assuming that the positions of the transponding stations are known, the distances between them and the initiating station are the basis for a circular solution of the position of the station I.

The station I can operate on the signals from the stations $T_1$ and $T_2$ at different times or, with duplication of some equipment, it can operate simultaneously on both signals.

Figure 3:
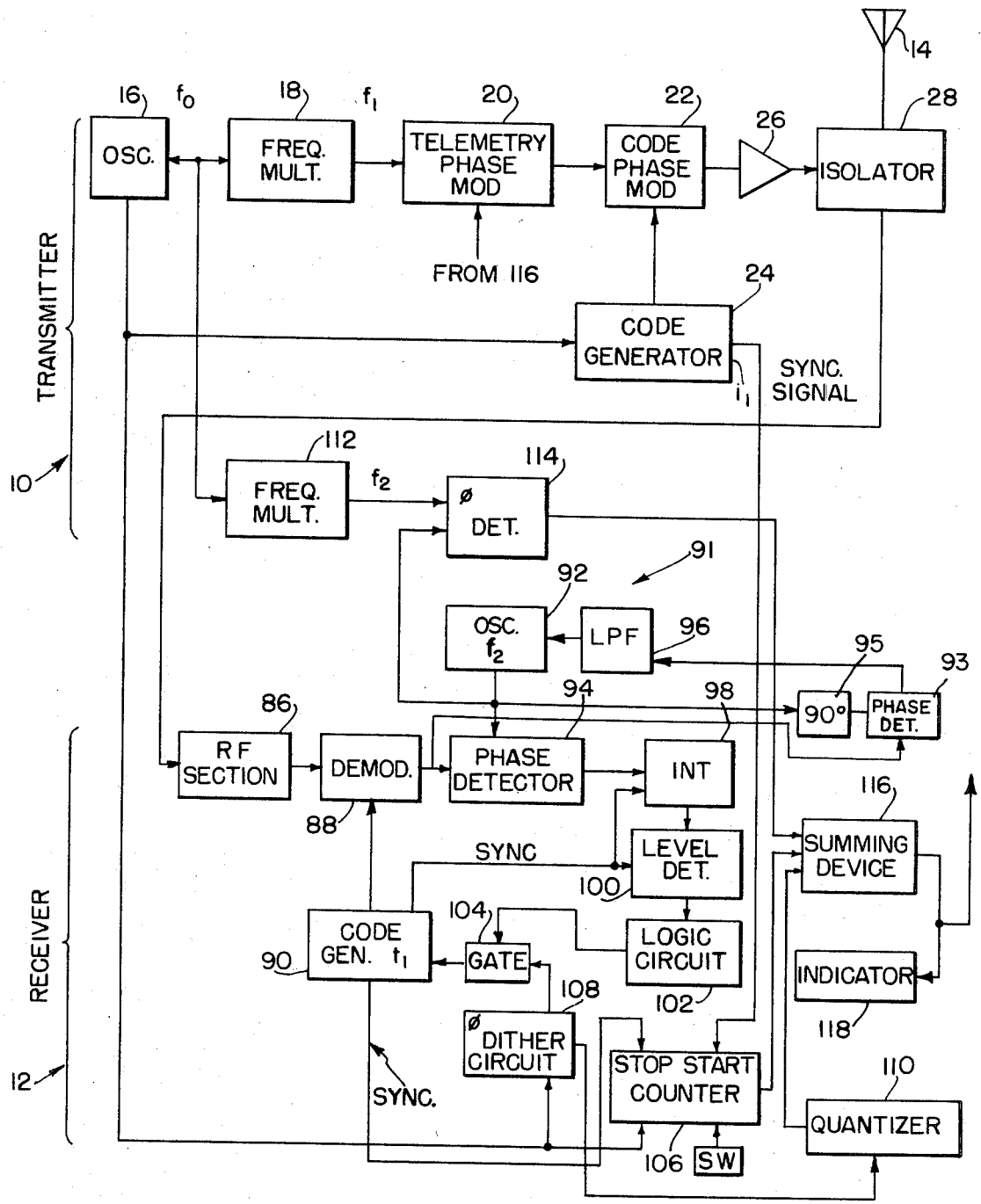
FIG. 3 is a block diagram of an initiating station used in the system.
Figure 4:
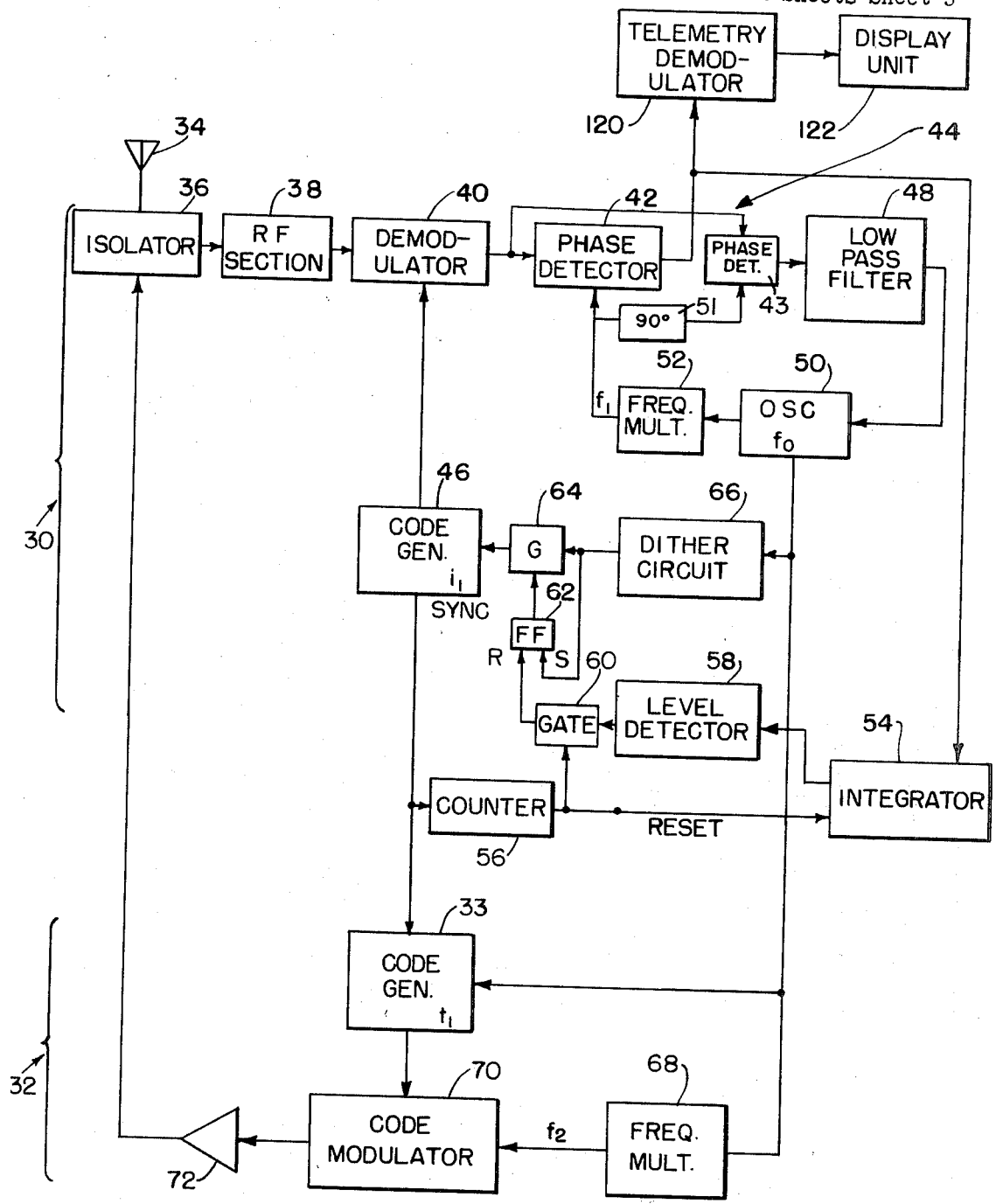
FIG. 4 is a block diagram of a transponding station.

With a large number of ships whose positions are to be determined, the overall cost of the system will be less if the range determination is made at the fixed shore stations, with the results then being transmitted to the respective ships. In that case the shore stations will be the initiating stations and the transponding stations will be on the ships. A system of this type is illustrated in FIGS. 3 and 4. As shown in FIG. 3, the initiating stage includes a transmitter 10 and a receiver 12 sharing a common antenna 14. The transmitter includes an oscillator 16 followed by a frequency multiplier (or divider) 18 and a telemetry modulator 20. The output of the modulator 20 is again modulated in a code modulator 22 in accordance with the output of a code generator 24. The resulting coded signal is amplified by the amplifier 26 and fed to the antenna 14 by way of an isolator 28.

For the purposes of the discussion immediately following, the telemetry modulator 20 can be disregarded.

The code generator 24 continuously generates a pseudo-random code word $i_1$. This generator may take the form of a shift register provided with a suitable feedback arrangement so that as the content of the register is shifted a succession of binary digits or bits appears at an output stage in accordance with the code to be generated. The application of this code to the modulator 22 causes the latter to impart a phase to the radio frequency input according to the instantaneous output of the generator 24. Preferably, the modulator 22 imparts a $+90°$ or $-90°$ phase to its radio frequency input depending on whether the output of the code generator is a zero or a one. Since this amount to a $180°$ phase difference between the two states, the modulator may simply take the form of a polarity-reversing switch that passes its radio frequency input to the amplifier 26 with a first polarity when the generator output is at zero and with reversed polarity when it is a one.

The code generator 24 emits its output digits in synchronism with the output of the oscillator 16. Thus, the rate $f_0$ at which the digits are applied to the code modulator 22 is an integral submultiple of the radio frequency $f_1$. Accordingly, each digit interval in the code contains an integral number of radio frequency cycles.

For reasons to be explained later, the code generator 24 emits a synchronizing signal once each time it recycles. This is readily accomplished by connecting the individual stages of its shift register to a coincidence circuit which emits an output signal each time the register attains a given condition. The code word $i_1$ may thus be defined as the succession of digits beginning and ending with each synchronizing signal.

The transponding station, illustrated schematically in FIG. 4 includes a receiver 30 and a transmitter 32. The receiver 30 demodulates the incoming code word $i_1$ from the initiating station and it then synchronizes a code generator 33 with this code word; it also synchronizes the phase of the transmitter with that of the incoming carrier. The transmiter 32 transmits back to the initiating station a carrier at the frequency $f_2$ modulated by the code word $t_1$ which is continuously generated by the generator 33. Finally the receiver 12 at the initiating station (FIG. 3) measures the difference in timing of the outgoing signal and the incoming signal to determine the range between the two stations.

With further reference to FIG. 4, the transponding station receives incoming signals from the initiating station by way of an antenna 34 and an isolator 36 connected to a wide band radio frequency section 38. The output of the radio frequency section is demodulated in a demodulator 40 whose output is applied to a phase detector 43 incorporated in a phase lock loop 44.

In the preferred embodiment of the invention the demodulator 40 is a polarity-reversing switch whose operation is identical with that of the code modulator 22 in the initating station (FIG. 3). It is controlled by the output of a code generator 46 generating the code word $i_1$ used in encoding the signal transmitted by the initiating staiton. The receiver 30 operates to bring the code generator 46 into rough synchronism (within one-bit width) with the code word contained in the incoming radio frequency signal.

More specifically, when the code word generated by the generator 46 is within one-half bit of synchronism with the incoming code word, the demodulator 40 will reverse the phase of the radio frequency signal at roughly the same points at which its phase is reversed by the encoding modulator 22 (FIG. 3). The output of the demodulator 40 will then be largely sinusoidal. The phase lock loop 44, which includes a low pass filter 48, a voltage-controlled oscillator 50, a $90°$ phase shifter 51 and a frequency multiplier 52, will then lock the phase of the frequency multiplier output to that of the incoming signal and the output of the phase detector 43 will have a small D.C. component.

On the other hand, if the code generator 46 is out of step with the incoming code word by as much as one bit or more, the resulting lack of correlation between the two code words will provide an essentially random phase distribution at the output of the demodulator 40. The phase lock loop, because of the low cutoff frequency of the filter 48, cannot follow these phase changes. Accordingly, the output of the phase detector 42 contain no phase error information. This is ordinarily the condition that exists when reception of a signal begins. The receiver then proceeds in the following manner to obtain rough synchronism between the code generator 46 and the incoming code word $i_1$ and close synchronism between the generator 33 and the word $i_1$.

The output of a phase detector 42 connected to receive inputs from the demodulator 40 and frequency multiplier 52 is applied to an integrator 54. The integrator 54 integrates over a period of several code words and then is reset by the output of a counter 56 that counts synchronizing signals from the code generator 46. As long as the generator 46 is at least one bit out of step with the incoming code word, with a resulting lack of a significant D.C. component in the output of the phase detector 42, the integrator 54 will have a negligible content at the end of each integrating period. This low level is sensed by a level detector 58 whose output enables a gate 60 to pass the reset signal from the counter 56 to a flip-flop 62.

Resetting of the flip-flop 62 disables a gate 64 in the path between the oscillator 50 and the generator 46. This prevents the next pulse from the oscillator 50 from reaching the generator 46. That pulse does, however, once again set the flip-flop 62 so that succeeding pulses are passed by the gate 64. The net result is that the code generator 46 falls behind by one bit.

This process continues, with the generator 46 falling behind one bit at a time until it is out of step with the incoming code word by less than one bit. When it reaches that point, there is some degree of correlation between the code words arriving at the demodulator 40 from the R.F. section 38 and the code generator 46. As a result, the phase detector 42 output includes a significant D.C. component which is integrated by the integrator 54. The level detector 58 therefore inhibits the gate 60 and thereby prevents resetting of the flip-flop 62 by the output of a counter 56. This in turn prevents inhibiting of the gate 64, and the step-by-step retarding of the code generator 46 ceases.

As pointed out above, there are an integral number of radio frequency cycles in the interval corresponding to each bit in the code word $i_1$. The pulse dropping operation accomplished by means of the gate 64 can match the code words applied to the demodulator 40 only to the nearest bit. To effect closer synchronization, the system must further modify the timing of the generator 46 to bring it within one radio frequency cycle of the incoming code word. This is all that is required of the generator 46, whose synchronizing signal is used to time the beginning of each code word $t_1$ in the generator 33 to within one cycle.

At this point the operation of a dither circuit 66 comes into play. In essence, the dither circuit, which is described subsequently in detail, alters the timing of the pulses from the oscillator 50 applied to the code generator 46 until it reaches the point at which the D.C. component in the output of the phase detector 42 is at a maximum. The code generators 46 and 33 are then within one radio frequency cycle of synchronism with the modulated code word $i_1$ arriving from the initiating station.

With an error of less than one cycle the phase lock loop 44 can operate effectively to match the phase output of the frequency multiplier 52 to that of the signal from the demodulator 40. The output of the oscillator 50 is thus exactly instep with the individual bits in the code words received from the initiating station. Since the oscillator signal triggers the code generator 33, the bits in the code word $t_1$ are precisely synchronized with their counterparts in the incoming code word $i_1$.

Specifically, coincidence of a pulse from the oscillator 50 with the synchronizing signal from the code generator 46 causes the code generator to begin its code word $t_1$ at that time. Since succeeding bits in the word $t_1$ are generated in response to the output of the oscillator 50, the word $t_1$ is exactly in step with the detected word $i_1$.

The output of the oscillator 50 is also fed to a frequency multiplier 68 having an output at the carrier frequency $f_2$ used in retransmitting to the initiating station. This carrier is modulated in a modulator 70 in accordance with the output of the code generator 33. The output of the modulator 70 is amplified by an amplifier 72 and then fed to the antenna 34 by way of the isolator 36.

Figure 5:
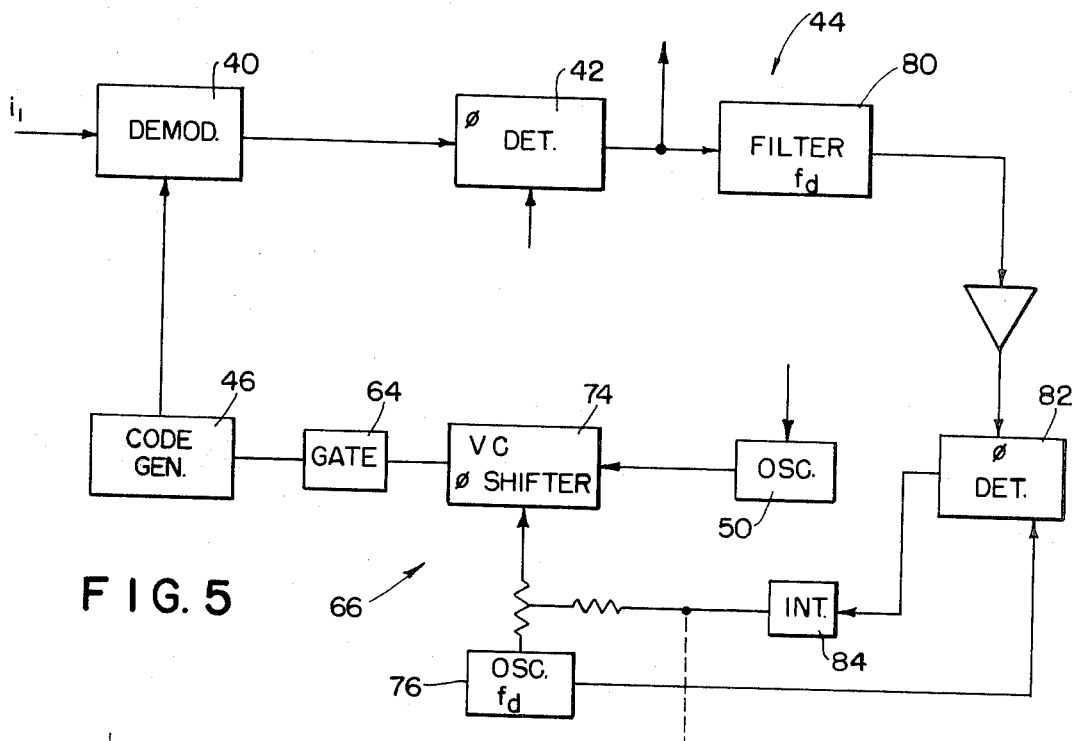
FIG. 5 is a block diagram of a dither circuit used in the initiating and transponding stations.

The dither circuit 66 is illustrated in detail in FIG. 5. The output of the oscillator 50 used in triggering the code generator 46 is passed through a voltage-controlled phase shifter 74 capable of varying the delay between the oscillator and the code generator over a range of approximately ten cycles, i.e. one code word bit. The phase shifter is varied back and forth over this range (or a fraction of this range) by the output of an oscillator 76. This causes the relative timing of the code generator 46 and the incoming code word $i_1$ to vary at the frequency $f_d$ of the oscillator 76.

Figure 6:
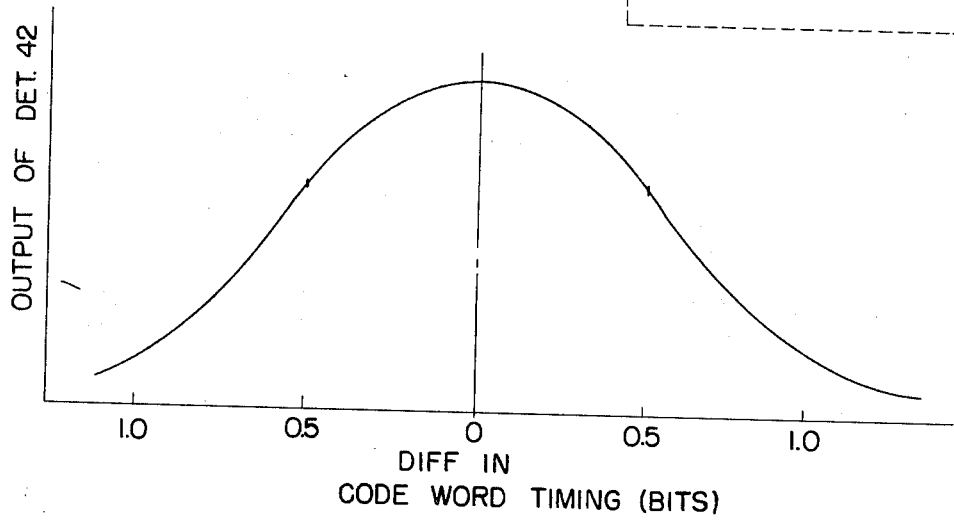
FIG. 6 illustrates the variations of integrator output as a function of code word synchronization in a receiver used in this system.

As shown in FIG. 6, the output of the detector 42 thus increases and decreases in accordance with the curve 78 due to the change in correlation between the codes. This periodic increase and decrease has a fundamental frequency $f_d$ whose phase depends on whether the operating point is on the right or the left of the zero point in FIG. 6.

The output of the phase detector 42 is applied to a narrow band filter 80 passing the frequency $f_d$. The amplified output of the filter 80 is one input of a phase detector 82 and the output of the oscillator 76 is the other input thereof. The output of the phase detector 82 is integrated by an integrator 84 whose content is summed with the output of the oscillator 76 to provide the control signal for the phase shifter 74.

The smoothed output of the phase detector 82 is a D.C. signal whose polarity depends on the phase of the signal from the filter 80 and thus on the direction of the error in code word timing. The application of this D.C. signal to the phase shifter 74 serves to reduce the error by appropriately shifting the timing of the code generator 46. Ultimately the error is reduced to less than the duration of one radio frequency cycle, i.e. $1/f_1$. For later reference it should be noted that the content of the integrator 84 is a measure of the amount by which the code generator 46 is shifted to reduce the error to this level.

Returning now to FIG. 3, the signal transmitted by the transponding station enters a radio frequency section 86 by way of the antenna 14 and isolator 28. The signal is then applied to a demodulator 88 controlled by a code generator 90 continuously generating the code word $t_1$. The output of the demodulator 88 is applied to a phase lock loop 91 including a voltage-controlled oscillator 92, a phase detector 93, a 90° phase shifter 95 and a low-pass filter 96. The signal from a phase detector 94 whose inputs are from the demodulator 88 and oscillator 92, is integrated by an integrator 98 whose output is sensed by a level detector 100. A logic circuit 102 responds to the output of the level detector 100 in controlling a gate 104 that passes shift signals to the code generator 90.

The elements 88–94 and 98–104 in the receiver 12 operate in the same manner as their counterparts in the receiver 30 at the transponding station. That is, they delay the code generator 90 one bit at a time until it is within one bit of synchronism with the code word $t_1$ received from the transponding station. In this case, however, the code generator is not shifted by signals from the voltage-controlled oscillator 92; but rather by the output of the oscillator 16. This is for the purpose of measuring the time interval required for transmission of the code word $i_1$ and reception of the responding code word $t_1$. The oscillator 16 serves as a clock in making this measurement.

The synchronizing signal from the code generator 24 is applied to a counter 106 to initiate the counting of cycles from the oscillator 16. The synchronizing signal from the code generator 90 serves as a stop signal for the counter. The content of the counter is thus the integral number of code word bit intervals between the transmission by the initiating station and reception of the return signal from the transponding station.

The receiver 12 also includes a dither circuit 108 that operates in the same fashion as the dither circuit 66 of FIGS. 4 and 5 to bring the code generator 90 within one radio frequency cycle of the timing of the incoming code word from the transponding station. The content of the integrator 84 (FIG. 5) in the dither circuit 108 is thus a measure of an additional integral number of cycles in the time interval between transmission and reception by the initiating station. This signal is applied to a quantizer 110 whose output corresponds to this number.

Finally, the signal from the oscillator 16 is applied to a frequency multiplier 112 whose output has the frequency $f_2$. This latter signal, together with the output of the oscillator 92 is applied to a phase detector 114. The oscillator 92 is locked to the phase of the radio frequency signal from the transponding station and thus the phase difference between the inputs to the phase detector 114 corresponds to a further increment in the time required for transmission to and reception from the transponding station. This increment is represented electrically by the output of the phase detector 114.

The signals from the counter 106, the quantizer 110 and the phase detector 114 are added in a summing device 116 whose output is an electrical representation of the propagation time to and from the transponding station. This signal may be registered by an indicator 118 calibrated in terms of distance. The summing device may be arranged to subtract, from the total time represented by its inputs, the fixed time required for signals to pass through the electronic equipments at the initiating and transponding stations. It should be noted that the quantities ascertained by the dither circuit 108 and phase detector 114 may be negative or positive in value, and the sum derived by the summing device 116 is therefore an algebraic sum of its input signals.

The telemetry phase modulator 20 is used when the information developed by the system is needed at the transponding station, for example, when the latter station is located on a ship whose position is to be determined. In such cases the summing device 116 is arranged to provide a binary output in serial form and this signal is used by the modulator 20. The degree of modulation by the modulator 20 is preferably less than that of the modulator 22, e.g. $\pm 30°$, as opposed to $\pm 90°$. A differential phase shift keying arrangement is used.

At the transponding station (FIG. 4) the telemetry signal is demodulated by a telemetry demodulator 120 whose output is displayed in a display unit 122. The demodulator 120, in its simplest form, includes a suitable filter, together with the logic circuits associated with differential phase shift keying systems. The information rate in the telemetry link is preferably substantially higher than the upper frequency limit of the phase lock loop 44, so that the phase lock loop does not follow the phase changes in the telemetry signal.

Figure 2:
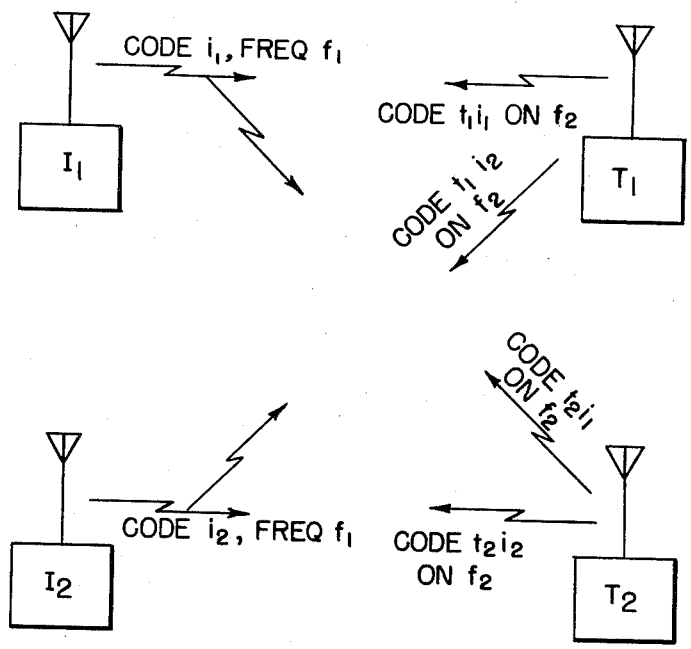
FIG. 2 is a block diagram of another system embodying the invention.

FIG. 2 shows a typical multiple-station arrangement incorporating the system of FIGS. 3 and 4. An initiating station $I_1$ transmits its code $i_1$ at a carrier frequency $f_1$ and a station $I_2$ transmits its code $i_2$ at the same carrier frequency. A transponding station $T_1$ has in essence two receiver-transmitter units of the type shown in FIG. 4, the units sharing common antennas and radio frequency sections. One of these units demodulates the code word $i_1$ and thereby locks a local oscillator to the signal from the station $I_1$. This unit retransmits a code word $t_1 i_1$, on frequency $f_2$, in synchronism with the code word $i_1$. The second unit at the transponding station $T_1$ operates in the same fashion on the signal from the station $I_1$ and retransmits a code word $t_1 i_2$ in synchronism with the signal received from that station.

Similarly, the transponding station $T_2$ transmits a code word $t_2 i_1$ on the frequency $f_2$ in synchronism with the code word $i_1$ from the station $I_1$ and transmits a code word $t_2 i_2$ on the same frequency in synchronism with code word $i_2$ received from the initiating station $I_2$.

Because of the pseudo-random nature of the code words $i_1$ and $i_2$ the two receiver-transmitter units in each of the transponding stations are able to separate the signals from the two initiating stations, even though the same carrier frequency $f_1$ is used. That is, there is very little correlation between the output of the code generator 46 (FIG. 4) and any code word other than the one generated in that code generator. Therefore, the receiver-transmitter unit incorporating the code generator will lock on only to a signal containing the same code word.

At the initiating station $I_1$ essentially separate receivers are used for the code word $t_1 i_1$ from the station $T_1$ and thec ode word $t_2 i_1$ from the station $T_2$. Again, because of the absence of correlation between these two code words, the station $I_1$ can operate independently on the two incoming signals to determine the ranges to the respective transponding stations. The station $I_2$ operates in similar fashion on the code words $t_1 i_2$ and $t_2 i_2$ from the transponding stations.

Figure 7:
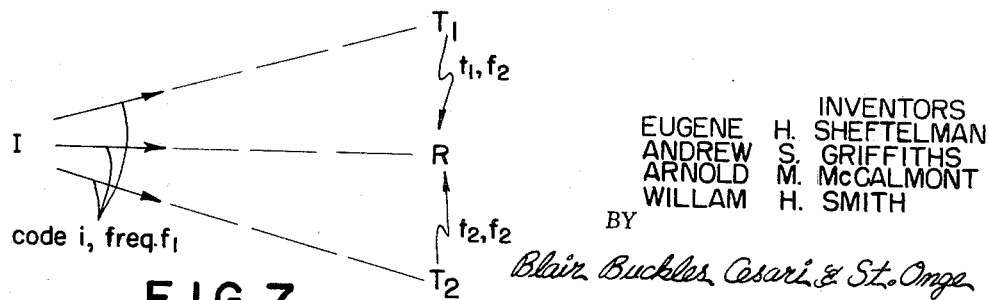
FIG. 7 is a diagram of yet another navigation system embodying the invention.

FIG. 7 illustrates another embodiment of the invention arranged to determine the position of an initiating station I with respect to transponding station $T_1$ and $T_2$ and a receiving station R. The station I transmits to all three of the stations $T_1$, $T_2$ and R, and the difference in the time of reception is determined for two pairs of the latter stations to locate the station I on an intersection of two hyperbolas corresponding to the two time differences.

In the illustrated configuration the system measures the difference in signal propagation time between the station I and the stations $T_1$ and R; it makes the same measurement for the stations $T_2$ and R. The station I transmits a code word $i$ on the frequency $f_1$ to all three of the stations $T_1$, $T_2$ and R. The transponding station $T_1$ retransmits to the station R, in synchronism with the incoming signal from the station I, a code word $t_1$ on the frequency $f_2$. In the manner described above, the station R determines the time interval between the signal received directly from the station I and the one received by way of the station $T_1$. This measurement determines the location of the station I on a first hyperbola.

Similarly, the station $T_2$ transmits to the station R a code word $t_2$ on the frequency $f_2$ in synchronism with the code word $i$ by the station $T_2$ received from the station I. The station R then measures the relative timing of the signals from the stations I and $T_2$ to determine a second hyperbola on which station I is located. The position of the station I is on an intersection of the two hyperbolas.

The equipment used in the various stations of FIG. 7 is similar to that illustrated in FIGS. 3 and 4. Specifically, the station I contains the elements in the transmitter 10 of FIG. 3, except for the telemetry modulator 20 and the isolator 28, which are not needed at this station. Each of the transponding stations $T_1$ and $T_2$ contains the equipment shown in FIG. 4, except for the telemetry demodulator 120 and display unit 122.

Finally, the receiving station R of FIG. 7 contains equipment similar to the receivers 12 and 30 of FIGS. 3 and 4, plus the code generator 33 of FIG. 4. In this case the R.F. section 38 (FIG. 4) is tuned to pass signals centered on the frequency $f_1$ and the code generator 46 generates the code word $i$. A code generator 33 generates the code word $t_1$ and in the manner described above this code word is exactly synchronized with the code word $i$ from the station I (FIG. 7).

With reference to FIG. 3, a receiver 12 used at the station R of FIG. 7 includes a code generator 90 that generates the code word $t_1$ received from the station $T_1$ (FIG. 1). However, instead of using the local oscillator 16 of FIG. 3 to time the individual bits from the generator 90, the system employs the signal from the oscillator 50 of FIG. 4. Similarly, instead of using the synchronizing signal from the code generator 24 of FIG. 3, the time measuring section of the receiver 12 employs a synchronizing signal from the code generator 33 of FIG. 4. Thus, instead of employing a locally generated signal as a time reference for the incoming signal from the transponding station $T_1$, the system uses the signal from the station I as received by means of the receiver 30.

Consequently, in the system of FIG. 6, the indicator 118 (FIG. 3) indicates the difference in time between signals from the station I received directly from that station and those received by way of the transponding station $T_1$. By subtracting from this difference the fixed, known time for signals received at the station $T_1$ to be relayed to the station R, one may ascertain the difference in propagation times between the station I and the stations R and $T_1$, thereby establishing one of the hyperbolas locating the station I. Indeed, the summing device 116 may be provided with an input corresponding to the time required for a signal to be relayed from the station $T_1$ to the station R, so that the output of the indicator 118 is the desired difference in propagation times.

The station R of FIG. 7 includes a second receiver 12 employing a code generator 90 generating the code word $t_2$. This receiver thus ascertains the relative timing of signals received from the stations I and $T_2$ to establish a second hyperbola locating the station I. The station R may also include a transmitter for transmitting back to the station I the location of the latter station as determined from the two timing measurements made at the station R.

It should be understood that in general the transmissions from the stations $T_1$ and $T_2$ to the station R need not be made in the manner described above. Since these three stations are at fixed locations, it may in some cases be practical and even advantageous to transmit from the transponding stations by means of a wire or microwave link or some other suitable means. Alternatively, rather than have two of the fixed stations relay the signals from the station I to a third station (the station R), one might arrange for each of the three fixed stations to time the incoming signal from the station I against a common time reference generated either at one of the stations or at all three. The three fixed stations might then transmit back to the station I the respective time intervals measured at the three stations, with computation of the position of the station I then being made at that station.

As mentioned above, the system of FIG. 7 can be reversed, with the three fixed stations transmitting in synchronism and the navigating station measuring the difference in propagating time between first one pair of the fixed stations and then the other pair. For this purpose the fixed station may use an arrangement of the type described above for the station R of FIG. 7.

It should be noted that one may make numerous other modifications of the overall arrangements described above. Moreover, a number of variations of the equipment at each station may be made without departing from the scope of the invention. A few of these will now be discussed.

If the transmission of an independently detectable carrier is permitted, one can substantially reduce the time required to align the incoming code word and its internally generated replica. Specifically, the phase lock loop takes a finite time to acquire the phase of the carrier and with the arrangement detailed above, this delay must be experienced with every trial code alignment. On the other hand, with a detectable carrier, the loop can acquire the carrier phase initially and then maintain it regardless of code alignment or misalignment. The delay of the phase lock loop will therefore be experienced only once. This technique can also be used with a constant spectral line at some other frequency than the carrier frequency.

Even when there is no detectable carrier, there are alterantive detection techniques to the above-described phase lock loop. For example, the output of the demodulator 88 (FIG. 3) might be fed to two mixers. The locally generated inputs for the mixers are derived from an oscilaltor that provides two quadratures-related outputs, one for each mixer. The outputs of the mixers are passed through "square law" detectors and then summed. The sum is a unidirectional signal if and only if the output of the demodulator has a substantial sinusoidal component, i.e.s if the incoming and internally generated code words are close to alignment. This signal can therefore be used to determine when alignment of the code words has been maximized. The output of the demodulator can then be one of the inputs of the phase detector 114. Alternatively, this modified system can be arranged so that after the code words have been substantially aligned, the phase of the local oscillator is adjusted to maximize the output of one of the mixers. The local oscillator will then have a definite phase relationship with the incoming carrier and its output can therefore be applied to the phase detector 114.

One might also pass the output of the demodulator 88 through a sharp filter tuned to the carrier frequency and apply the output of the filter to a conventional rectifier-detector. Since the D.C. output of the detector would then depend on the presence of the carrier in the demodulator output, it could be used to determine alignment of the two code words. While conceptually simpler than the other arrangements described above, this scheme will ordinarily require more expensive components.

These alternative detection arrangements all avoid the phase lock loop delay encountered during each trial code alignment with the circuits of FIGS. 3 and 4. However, the illustrated circuit provides a better signal-to-noise ratio than the two alternative techniques described for use in systems having no independently detectable carrier.

In any case, all such detection techniques require a frequency reference which has an essentially constant phase relationship with the incoming (i.e. reconstituted) carrier, whether this reference be locally generated or derived directly from the incoming signal.

For the purposes of the foregoing description and the following claims, a modulated signal is deemed to include a carrier even though it may contain no spectral line at the carrier frequency (i.e. it is not independently detectable). When there is no such spectral line, the carrier is recovered from the signal by reconstituting it in the demodulator.

Moreover, although it is impossible to compare directly the phases of signals having different frequencies, comparison may be effected, within the meaning of the present invention, by changing the frequency of one or both signals so that both have the same frequency. Thus, the phase detector 114 of FIG. 3 may be said to compare the phases of the carrier transmitted by the transmitter 10 ($f_1$) and received by the receiver 12 ($f_2$), even though the frequencies of these carriers may differ. This is accomplished by multiplying in the multiplier 12, a submultiple ($f_0$) of the frequency $f_1$ derived from the source (oscillator 16) of the transmitted carrier. In this case the oscilaltor 16 provides a time reference for the system. On the other hand, when the times of arrival of two signals are being compared, as in the system of FIG. 7, one of the incoming signals is a time reference for the other.

Conceivably, the bit-by-bit shifting of the code generator 46 (FIG. 4) to obtain rough synchronization with the incoming code word might take an inordinately long time if the two words are substantially misaligned at the outset. Assuming that the position of the transponding station is known approximately, this problem is readily overcome by synchronizing the transmitted core word transmission from the initiating station with standard time signals such as those transmitted by radio station WWV. The operator at the transponding station can then readily calculate the approximate time interval to be expected between his reception of the same timing signals and the ensuing reception of the beginning of each code word. He sets the generator 46 to begin each of its code words slightly before the end of this time interval. The pulse dropping arrangement used in the step-by-step retiming of the generator 46 then quickly brings the generator into alignment with the incoming code word.

The retiming of the code generator 46 (FIG. 4) and the code generator 90 (FIG. 3) can also be accomplished by inserting an extra shift pulse instead of dropping a pulse as in the above described arrangement. However, pulse dropping is generally preferred. Pulse dropping delays the internal code word generation and this corresponds to an increase in range, or more accurately, an increase in propagation time. Accordingly, if both ground-wave and sky-wave signals are being received at the same time, the locally-generated code will be aligned with the ground-wave signal before the sky-wave signal is reached by the synchronizing arrangement. As pointed out above, this is highly desirable because of the relative constancy of ground-wave propagation time.

In some applications of the system there may be multiple path situations in which the system cannot ascertain the correct incoming signal merely by using the shortest propagation time as a criterion. In that case, the receiver can be modified to (a) lock on to an incoming signal until such time as the range corresponding to that signal has been ascertained and then (b) once again retard (or advance) its internal code generator to search for any other signals that may be correlated with the code word. If such a signal is found, the same computation process can be repeated and this can be continued until all such signals have been thus processed. One might then select one of these signals according to another criterion, e.g. maximum output in the integrator 54 (FIG. 4).

It will thus be seen that the objects set forth above, among those made apparent from the preceding description, are efficiently attained and, since certain changes may be made in carrying out the above system without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A radio navigation system of the type which measures the propagation time of wireless signals between two stations or the difference in propagation time of signals between a station and two other stations, at least one of the stations in the system being a time-measuring station, at least one station being a transmitting station and at least one station being a receiving station, said system including the improvement in which
  (A) said stations operate in the medium or high frequency range,
  (B) the transmitting stations transmit signals in the form of carriers modulated in accordance with repeated pseudo-random code words by means of wideband modulation techniques so as to minimize interference between the signals and other signals in the same band,
  (C) said system includes a receiver comprising
    (1) an antenna,
    (2) means for generating an internally generated code word identical with a code word transmitted by a transmitter in said system,
    (3) means for correlating the output of said antenna with the output of said generating means so as to detect said transmitted code word while minimizing interference from other signals, including signals from the same transmitter propagated along other than the selected paths,
    (4) means responsive to the output of said correlating means for maintaining said generating means in at least rough alignment with said transmitted code word, and
  (D) said system includes time-measuring means including
    (1) means for generating a time reference, and
    (2) means for ascertaining the timing of said internally-generated code word relative to said time reference.

2. The system defined in claim 1.
  (A) including means for modulating the carriers in such manner as to provide a transmitted signal containing no dominant spectral line, and
  (B) in which each correlating means includes
    (1) a local continuous wave generator having the frequency of the carrier of the received signal,
    (2) means for sequencing the code generating means in response to said continuous wave generator and at the rate of the code word in the received signal,
    (3) means for adjusting the timing of said code generating means relative to the output of said continuous wave generator so as to maximize the degree of correlation between the code word generated by said code generating means and the code word in the received signal, and
    (4) a phase lock loop connected to lock the phase of said continuous wave generator to that of said received carrier.

3. The system defined in claim 2 in which each transmitting station includes
  (A) means for modulating a carrier with a code word each of whose elements has the duration of a plurality of carrier cycles and a fixed time relationship to the carrier, and
  (B) means for transmitting the modulated carrier to provide the signal received by one or more of said receivers.

4. A navigation system comprising
  (A) a transmitting station including
    (1) means for generating a medium or high frequency carrier,
    (2) a first code generator generating a pseudo-random code word in synchronism with said carrier, and with a plurality of carrier cycles per code word bit,
    (3) means for modulating said carrier with the output of said first generator so as to provide a transmitted signal having an absence of a spectral line at the carrier frequency,
  (B) a second station for receiving the signal transmitted by said first station, said second station including
    (1) a second code generator generating said code word,
    (2) a continuous wave generator, said second code generator generating the respective elements of its said code word in response to said continuous wave generator,
    (3) a synchronous detecting circuit including means for multiplying the output of said second code generator, the output of said continuous wave generator and the received signal, thereby to provide a correlation signal indicative of the degree of correlation between the output of said second code generator and the code word in the received signal,
    (4) a phase lock loop including said continuous wave generator for locking the phase of said continuous wave generator to the phase of the carrier of said received signal, (C) means responsive to said correlation signal for adjusting the relative timing of the output of said second code generator relative to the output of said continuous wave generator to maximize said correlation, and (D) means at said second station or another station for measuring the timing of said code word in said received signal relative to a time reference.

5. The system defined in claim 4

(A) in which said second station is a transponding station further including means for transmitting a medium or high frequency carrier modulated with a pseudo-random code word synchronized with the code word in the signal received from said transmitting station, (B) including at a station other than said second station
  (1) means for demodulating the modulated carrier from said second station, and
  (2) means for comparing the timing of arrival of the code word from said second station with said time reference.

6. The system defined in claim 5 in which said timing means times the arrival of said signal from said second station with respect to the output of said first code generator.

7. The system defined in claim 4

(A) in which said second station is a transponding station including
  (1) means providing a second carrier in the medium or high frequency range,
  (2) a third pseudo-random code generator generating a pseudo-random code word in synchronism with said second carrier and with a plurality of carrier cycles per code word bit,
  (3) means synchronizing said second generator with the code word received from said first station so that the timing of the output of said third generator is a measure of the transmission time between said first and second stations,
  (4) means for modulating said second carrier with the output of said third generator so as to provide an absence of a spectral line at the carrier frequency,
  (5) means for transmitting the signal resulting from modulation of said second carrier, (B) including means at said first station or another station for
  (1) demodulating the signal from said second station, and
  (2) distinguishing the signal from interference within the band of the signal
  by means of correlation with an internally-generated replica of the code word contained in the signal, and (C) in which said timing means measures the timing of the code word in said signal from said second station with respect to said time reference.

8. The system defined in claim 7 in which (A) a station other than said first station includes
  (1) a fourth code generator generating a replica, of the code word generated by said third code generator,
  (2) a second continuous wave generator, said fourth code generator generating the respective elements of its code word in response to said second continuous wave generator,
  (3) a synchronous detecting circuit including means for multiplying
    (a) the output of said fourth code generator,
    (b) the output of said second continuous wave generator and
    (c) the signal from said second station, thereby to provide a second correlation signal indicative of the degree of correlation between the output of said fourth code generator and the code word in said signal from said second station,
  (4) a phase lock loop including said second continuous wave generator for locking the phase of said second continuous wave generator to the phase of the carrier of said signal from said second station,
  (5) means responsive to said second correlation signal for adjusting the timing of the output of said fourth code generator relative to the output of said second continuous wave generator to maximize said correlation between the output of said fourth code generator and the code word in the signal from said second station, and (B) said timing means provides a first timing signal corresponding to the difference in the timing of said first and fourth code generators.

9. The system defined in claim 7 in which (A) said first station includes
  (1) a fourth code generator generating a replica of the code word generated by said third code generator,
  (2) a second continuous wave genertor, said fourth code generator generating the respective elements of its code word in response to said second continuous wave generator,
  (3) a synchronous detecting circuit including means for multiplying the
    (a) output of said fourth code generator,
    (b) the output of said second continuous wave generator and
    (c) the signal from said second station, thereby to provide a second correlation signal indicative of the degree of correlation between the output of said fourth code generator and the code word in said signal from said second station,
  (4) a phase lock loop including said second continuous wave generator for locking the phase of said second continuous wave generator to the phase of the carrier of said signal from said second station,
  (5) means responsive to said second correlation signal for adjusting the timing of the output of said fourth code generator relative to the output of said second continuous wave generator to maximize said correlation between the output of said fourth code generator and the code word in the signal from said second station, and (B) said timing means provides a first timing signal corresponding to the difference in the timing of said first and fourth code generators.

10. The system defined in claim 9

(A) including means for deriving said second carrier from said first continuous wave generator, whereby said second carrier has a predetermined phase relative to the carrier received by said second station, (B) in which said timing means includes means developing a second timing signal corresponding to the difference in phase between the carrier transmitted by said first station and the output of said second continuous wave generator.

11. A navigation station comprising a wireless receiver including (A) input means selectively providing an output in response to an incoming signal in the medium or high frequency range, (B) a first code generator for generating a pseudo-random code word identical with a code word in the incoming signal, (C) a continuous wave generator, said first code generator generating the respective elements of its code word in response to said continuous wave generator, (D) a synchronous detecting circuit including means for multiplying
- (a) the output of said first code generator,
- (b) the output of said continuous wave generator and
- (c) the output of said input means, thereby providing a correlation signal indicative of the degree of correlation between the output of said second code generator and said code word in said incoming signal, (E) a phase lock loop including said continuous wave generator for locking the phase of said continuous wave generator to the phase of the carrier in the output of said input means, (F) means responsive to said correlation signal for adjusting the timing of the output of said first code generator relative to the output of said continuous wave generator to maximize said correlation, and (G) means for comparing the timing of said first code generator and the phase of said continuous wave generator with the timing of a reference signal.

12. The system defined in claim 11 in which said adjusting means includes
(A) means for adjusting said relative timing of said first code generator at a cyclic rate less than the rate of repetition of said code word,
(B) means for developing an error signal in response to the resulting variation in correlation between the incoming code word and the code word generated by said first code generator, said error signal indicating the time lead or lag of said first code generator with respect to said incoming code word, and
(C) means for altering the average timing of said first code generator so as to minimize said error signal.

13. A transponding station for a navigation system, said station comprising
(A) a receiver including
(1) input means selectively providing an output in response to an incoming signal in the medium or high frequency range,
(2) a first code generator for generating a pseudo-random code word identical with a code word in the incoming signal,
(3) a continuous wave generator, said first code generator generating successive elements of its code word in response to said continuous wave generator, said continuous wave generator providing an output at the frequency of the carrier in the output of said input means,
(4) a synchronous detecting circuit including means for multiplying
- (a) the output of said first code generator,
- (b) the output of said continuous wave generator and
- (c) the output of said input means, thereby providing a correlation signal indicative of the degree of correlation between the output of said second code generator and the code word in said incoming signal, (5) a phase lock loop including said continuous wave generator for locking the phase of said continuous wave generator to the phase of the carrier in the output of said input means, (6) means responsive to said correlation signal for adjusting the timing of the output of said first code generator relative to said continuous wave generator to maximize said correlation, and (B) means for transmitting a carrier
(1) synchronized with said continuous wave generator,
(2) in the medium to high frequency range,
(3) modulated by a pseudo-random code word synchronized with said first code generator and said continuous wave generator, whereby the carrier and code word transmitted by said transmitting means have a predetermined timing relative to their counterparts in the incoming signal.

14. The station defined in claim 13 including
(A) means for developing a first signal whose frequency is a submultiple of the frequency of said carrier frequency output of said continuous wave generator, and whose phase corresponds with that of said carrier frequency output, and
(B) a frequency multiplier connected to multiply the frequency of said first signal to provide the carrier transmitted by said transmitting means.

15. The station defined in claim 14 in which said adjusting means includes
(A) means for adjusting said relative timing of said first code generator at a cyclic rate less than the rate of repetition of said code word,
(B) means for developing an error signal in response to the resulting variation in correlation between the incoming code word and the code word generated by said first code generator, said error signal indicating the time lead or lag of said first code generator with respect to said incoming code word, and
(C) means for altering the average timing of said first code generator so as to minimize said error signal.

References Cited
UNITED STATES PATENTS

| | | | |
|---|---|---|---|
| 3,117,317 | 1/1964 | Kenyon | 343—13 |
| 3,157,874 | 11/1964 | Altar et al. | |
| 3,183,506 | 5/1965 | Webb. | |
| 3,341,845 | 9/1967 | Deman | 343—6.5 |

RODNEY D. BENNETT, Primary Examiner

M. F. HUBLER, Assistant Examiner

U.S. Cl. X.R.

343—13